(12) United States Patent
Yuasa et al.

(10) Patent No.: US 7,161,277 B2
(45) Date of Patent: Jan. 9, 2007

(54) DRIVING DEVICE

(75) Inventors: Tomoyuki Yuasa, Sakai (JP); Satoshi Shinke, Sakai (JP)

(73) Assignee: Konica Minolta Opto, Inc., Hachioji (JP)

( * ) Notice: Subject to any disclaimer, the term of this patent is extended or adjusted under 35 U.S.C. 154(b) by 130 days.

(21) Appl. No.: 10/980,511

(22) Filed: Nov. 3, 2004

(65) Prior Publication Data
US 2005/0242688 A1    Nov. 3, 2005

(30) Foreign Application Priority Data
Apr. 28, 2004   (JP)  ............................... 2004-133293

(51) Int. Cl.
*H01L 41/08*    (2006.01)
(52) U.S. Cl. ............................ 310/323.02; 310/316.02; 310/317
(58) Field of Classification Search ........... 310/316.01, 310/316.02, 317, 323.02
See application file for complete search history.

(56) References Cited

U.S. PATENT DOCUMENTS

| | | | | |
|---|---|---|---|---|
| 6,232,697 B1 * | 5/2001 | Mizumoto | .................. | 310/317 |
| 6,512,321 B1 * | 1/2003 | Yoshida et al. | ......... | 310/316.01 |
| 6,528,926 B1 * | 3/2003 | Okamoto et al. | ...... | 310/323.17 |
| 6,717,329 B1 * | 4/2004 | Yoshida et al. | ......... | 310/316.02 |
| 6,727,635 B1 * | 4/2004 | Okamoto et al. | ...... | 310/316.01 |
| 6,803,699 B1 * | 10/2004 | Yuasa et al. | ................. | 310/317 |

FOREIGN PATENT DOCUMENTS

| JP | 11-41953 A | 2/1999 |
|---|---|---|
| JP | 11-98865 A | 4/1999 |

* cited by examiner

*Primary Examiner*—Mark Budd
(74) *Attorney, Agent, or Firm*—Sidley Austin LLP

(57) ABSTRACT

In a drive apparatus having a vibration-generator including a plurality of electromechanical conversion elements, a plurality of weights located between each of the electromechanical conversion elements, and a rod fixed to one end of an electromechanical conversion element, a mass and a spring constant of each component included in the vibration-generator are determined, so that a relationship of integral multiple is satisfied. Thus, highly efficient driving with taking advantage of the resonance frequencies can be realized, and thus the energy consumption can be saved.

9 Claims, 13 Drawing Sheets

DRIVING DEVICE

This application is based on applications No. 133293/2004 filed in Japan, the contents of which are hereby incorporated by reference.

BACKGROUND OF THE INVENTION

1. Field of the Invention

The present invention relates to a driving device, and particularly to a driving device which comprises an electromechanical conversion element such as a piezoelectric element or the like. The driving device of the present invention is suitably used as a lens-driving mechanism of a camera or a driving mechanism of a precision stage.

2. Description of the Related Art

The Japanese patent publication of JP-A-11-98865 discloses a driving device as shown in the exploded perspective view in FIG. 1A and the assembly diagram thereof in FIG. 1B. This driving device comprises an electromechanical conversion element such as a piezoelectric element, of which the length changes (expands or contracts) under application of a voltage.

In this driving device, the slider 10 can be moved relative to the base 1. For example, this driving device can be used as a lens-driving device for a camera. That is, a lens frame of the camera is connected with the slider 10, such that the associated lens is driven together with the slider 10.

The piezoelectric element 4 is composed of a plurality of laminated piezoelectric plates. One end 4a of the piezoelectric element 4 in its expanding or contracting direction is fixed to the base 1, and the other end 4b is fixed to one end 5a of the rod 5. The rod 5 is slidably supported by the support walls 2 and 3 which are integrally formed with the base 1.

The slider 10 is frictionally engaged with the outer surface of the rod 5, wherein the rod 5 is sandwiched between the body 11 and the cap 12 of the slider 10, and a leaf spring 13 imparts an urging force to the body 11 and the cap 12 in approaching direction.

The piezoelectric element 4 is connected to a voltage-controlling circuit or drive-pulse generator (not shown). When a predetermined drive voltage with sawtooth-like waveform is applied to the piezoelectric element 4, the piezoelectric element 4 vibrates while drawing substantially the same sawtooth-like displacement (FIG. 2). With this vibration, the rod 5 also vibrates in its longitudinal direction, while drawing sawtooth-like displacement. That is, the graph in FIG. 2 shows the displacement of the rod 5 due to the vibration, as well as the displacement of the piezoelectric element 4 due to the vibration.

This is described in more detail. During the interval "A" of the first waveform 100, a gentle rising inclination 101 is shown, and during this interval, the piezoelectric element 4 expands at a relatively slow rate, and the rod 5 slowly moves in the arrow direction I in FIG. 1B. Next, during the interval "B", the piezoelectric element 4 abruptly contracts to its initial length (the portion of the waveform indicated by the falling inclination 102), and the rod 5 rapidly moves in the arrow direction II.

The same is repeated thereafter, and consequently, the rod 5 vibrates while alternately repeating the slow motion in the direction I and the rapid motion in the direction II. In this way, the rod 5 vibrates while drawing sawtooth-like vibration waveforms, with gentle and acute alternations.

The force of the leaf spring 13 of the slider 10 (i.e., the frictional engaging force of the slider 10 to the rod 5) is adjusted, such that when the rod 5 slowly moves (in other words, when the rod 5 moves at a rate smaller than a predetermined value), the slider 10 moves together with the rod 5, and when the rod 5 rapidly moves (in other words, when the rod 5 moves at a rate larger than the above predetermined value), the slider 10 stops there due to its inertia, or moves a little compared with that of the rod 5, as shown in FIG. 3. As a result, the slider 10 moves relative to the base 1 in the direction I during the rod 5 is vibrating.

When the slider 10 is to be moved in the arrow direction II on FIG. 1B, the vibration waveform of the piezoelectric element 4 and the rod 5 would be a reverse of the waveform shown in FIG. 2, and such the reversed waveform has alternately an acute rising portion and a gentle falling portion. The principle for moving the slider 10 is the same as described above.

As mentioned above, it is needed to vibrate the rod 5, with which the slider 10 is frictionally engaged, with drawing a sawtooth-like waveform. One of the methods for causing such the vibration is disclosed in the Japanese patent publication of JP-A-11-41953.

According to the Japanese patent publication of JP-A-11-41953, a plurality of piezoelectric elements are disposed in series. To each of the piezoelectric elements, a waving voltage expressed by a laterally symmetric pulse waveform (such as a sine wave) is applied. But, the waving voltages are of different amplitudes and cycles from each other. Thus, in a total observation during the rod's vibration, the moving speed of the rod in one direction and the moving speed in the other direction are made different from each other.

According to the Japanese patent publication of JP-A-11-41953, the rod can be vibrated drawing sawtooth-like waveforms, by applying a voltage with simple sine waveform to each of the piezoelectric elements, without the need of generating a voltage with sawtooth-like waveform. Therefore, this method has an advantage in that the constitution of the drive circuit can be simplified.

In general, the gain can be the local maximum when a resonance frequency is input to a physical vibration system. That is, in the case where the driving is caused by inputting alternating signals to a plurality of piezoelectric elements as in the Japanese patent publication of JP-A-11-41953, highly efficient driving would be realized if a resonance frequency of the vibration system is input.

Accordingly, in the case of using a plurality of piezoelectric elements, it becomes possible to realize highly efficient driving and the energy consumption can be saved by the followings: that is, a first resonance frequency is input to a first piezoelectric element, a second resonance frequency is input to a second piezoelectric element, and the same is repeated, so that an "n"th resonance frequency is input to an "n"th piezoelectric element.

If the resonance frequencies are in a relationship of integral multiple (that is, f1=f2/2= . . . =fn/n, where the first resonance frequency is f1, the second resonance frequency is f2, . . . , and the "n"th resonance frequency is fn), inputting each of the resonance frequencies to each of the piezoelectric elements respectively would realize a regular sawtooth-like vibration waving with a constant cycle.

However, in case that the resonance frequencies are not in the above-mentioned relationship of integral multiple (in general, in a certain physical vibration system, it is not always that the resonance frequencies are in the relationship of integral multiple), the local maximum value of the gain is not regularly obtained even if each of the resonance frequencies is input to each of the piezoelectric elements. Therefore, a regular sawtooth-like vibration waveform consisting of regularly repeated same wave-sections can not be obtained. In other words, highly efficient driving with taking advantage of resonance can not be realized.

SUMMERY OF THE INVENTION

An object of the present invention is therefore to realize a physical structure in which the resonance frequencies thereof are of a relationship of integral multiple, in a driving device comprising a plurality of electromechanical conversion elements disposed in series (a physical vibration system), and thereby to realize a highly efficient driving with taking advantage of resonance frequencies.

In order to achieve the objects of the present invention, there is provided a driving device comprising:

a vibration-generator comprised of a first weight fixed to a predetermined steady surface; a first electromechanical conversion element, one end of which in its expanding or contracting direction is fixed to the first weight; a second weight fixed to the other end of the first electromechanical conversion element in the expanding or contracting direction; a second electromechanical conversion element, one end of which in its expanding or contracting direction is fixed to the second weight; and a rod fixed to the other end of the second electromechanical conversion element in the expanding or contracting direction, a slider which is frictionally engaged with the outer surface of the rod of the vibration-generator, and a degree of the frictional engagement is set, so that the slider can move together with the rod when the rod is moved at a speed lower than a predetermined speed, and a moving amount of the slider becomes smaller than that of the rod when the rod is moved at a speed higher than the predetermined speed, and a drive circuit which applies voltages to the first electromechanical conversion element and the second electromechanical conversion element to cause the rod to vibrate, such that a moving speed of the rod in one direction is lower than the predetermined speed and a moving speed of the rod in the other direction is higher than the predetermined speed, so as to move the slider along the rod in the one direction, characterized in that a second resonance frequency of the vibration-generator is set to be twice a first resonance frequency thereof by satisfying the following equation, where a mass of the first weight is $m_{w1}$; a mass of the first electromechanical conversion element is $m_{p1}$; a spring constant of the first electromechanical conversion element is $k_{p1}$; a mass of the second weight is $m_{w2}$; a mass of the second electromechanical conversion element is $m_{p2}$; a spring constant of the second electromechanical conversion element is $k_{p2}$; and a mass of the rod is $m_r$.

$$\frac{1}{K_{p1}K_{p2}}\left(m_{w1}+\frac{2}{\pi^2}m_{p1}\right)\left(\frac{2}{\pi^2}m_{p1}+m_{w2}+\frac{2}{\pi^2}m_{p2}\right) \quad \text{[Equation]}$$

$$\frac{\left(\frac{2}{\pi^2}m_{p2}+m_r\right)\left(m_{w1}+m_{w2}+m_r+\frac{4}{\pi^2}m_{p1}+\frac{4}{\pi^2}m_{p2}\right)}{\left(\frac{1}{K_{p2}}\left(\frac{2}{\pi^2}m_{p1}+m_{w2}+\frac{2}{\pi^2}m_{p2}\right)\left(\frac{2}{\pi^2}m_{p2}+m_r\right)+\right.}=\frac{4}{25}$$

$$\left(\frac{1}{K_{p1}}+\frac{1}{K_{p2}}\right)\left(m_{w1}+\frac{2}{\pi^2}m_{p1}\right)\left(\frac{2}{\pi^2}m_{p2}+m_r\right)+$$

$$\left.\frac{1}{K_{p1}}\left(m_{w1}+\frac{2}{\pi^2}m_{p1}\right)\left(\frac{2}{\pi^2}m_{p1}+m_{w2}+\frac{2}{\pi^2}m_{p2}\right)\right)^2$$

The above equation is derived by modeling the physical system of the above vibration-generator into an electric circuit in accordance with the Force-Voltage Method.

The number of the electromechanical conversion elements is not always limited to two as above. Even in the case where three or more ("n") electromechanical conversion elements are used, the resonance frequencies of such the vibration-generator can be set in accordance with the same idea. That is, it is possible to determine the masses of the weights, and the masses and the spring constants of the electromechanical conversion elements of the vibration-generator, so that the relationship of f1=f2/2, . . . , =fn/n can be satisfied, where the first resonance frequency is f1, the second resonance frequency is f2, . . . , and the "n"th resonance frequency is fn, in the vibration-generator.

In the driving device of the present invention constructed as above, the resonance frequencies of the vibration-generator have the relationship of integral multiple. Accordingly, by inputting each of the resonance frequencies to each of the electromechanical conversion elements, a repeatable sawtooth-like waveform of the rod vibration can be realized, which waves at a predetermined cycle. In other words, highly efficient driving with taking advantage of the resonance frequencies can be realized, and thus the energy consumption can be saved.

BRIEF DESCRIPTION OF THE DRAWINGS

These and other objects and features of the present invention will become apparent from the following description taken in conjunction with the preferred embodiments thereof with reference to the accompanying drawings.

DETAILED DESCRIPTION OF THE PREFERRED EMBODIMENT

<First Embodiment (FIGS. 4 to 9)>

Figure 4A:
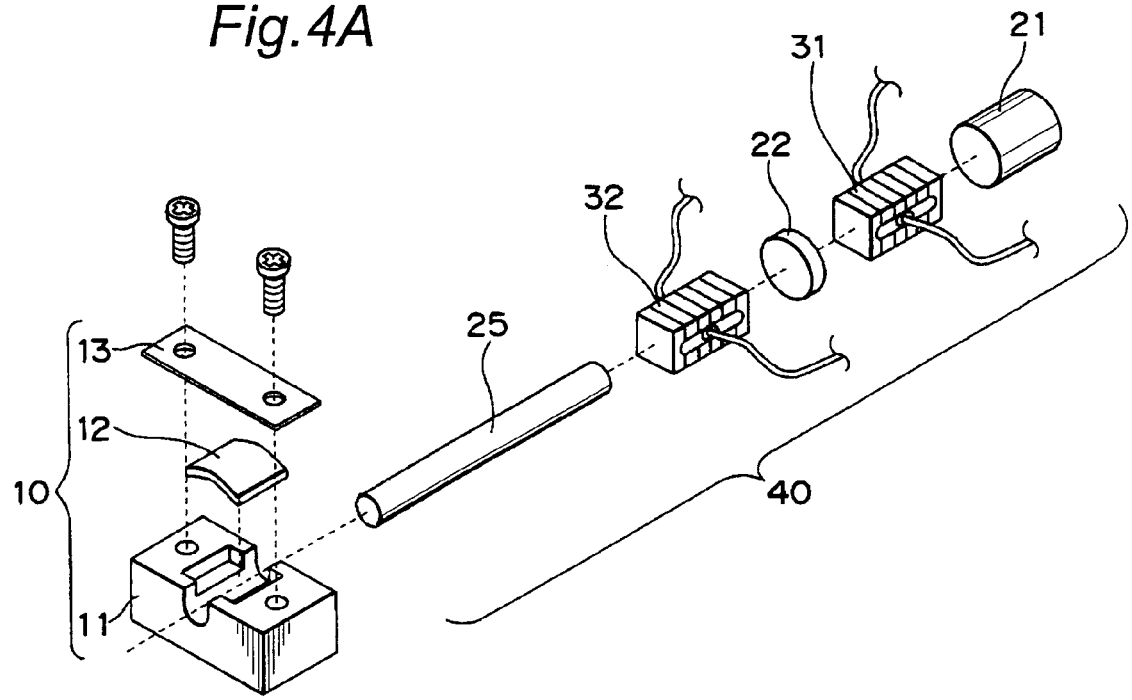
FIG. 4A shows an exploded perspective view of a driving device according to the first embodiment of the present invention.
Figure 4B:
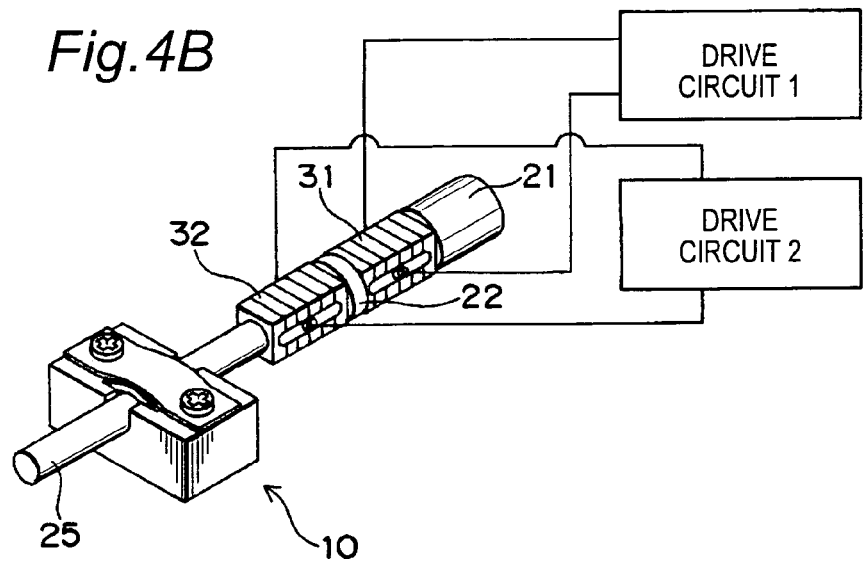
FIG. 4B shows an assembly diagram thereof.

FIG. 4A shows an exploded perspective view of a driving device according to the first embodiment of the present invention, and FIG. 4B shows an assembly diagram thereof.

In this driving device, the first piezoelectric element 31 and the second piezoelectric element 32 are connected in series in the expanding or contracting direction, via the second weight 22. As shown in FIG. 4B, the piezoelectric elements 31 and 32 are driven by the drive circuits (driving-pulse generator) 1 and 2, respectively.

Figure 1A:
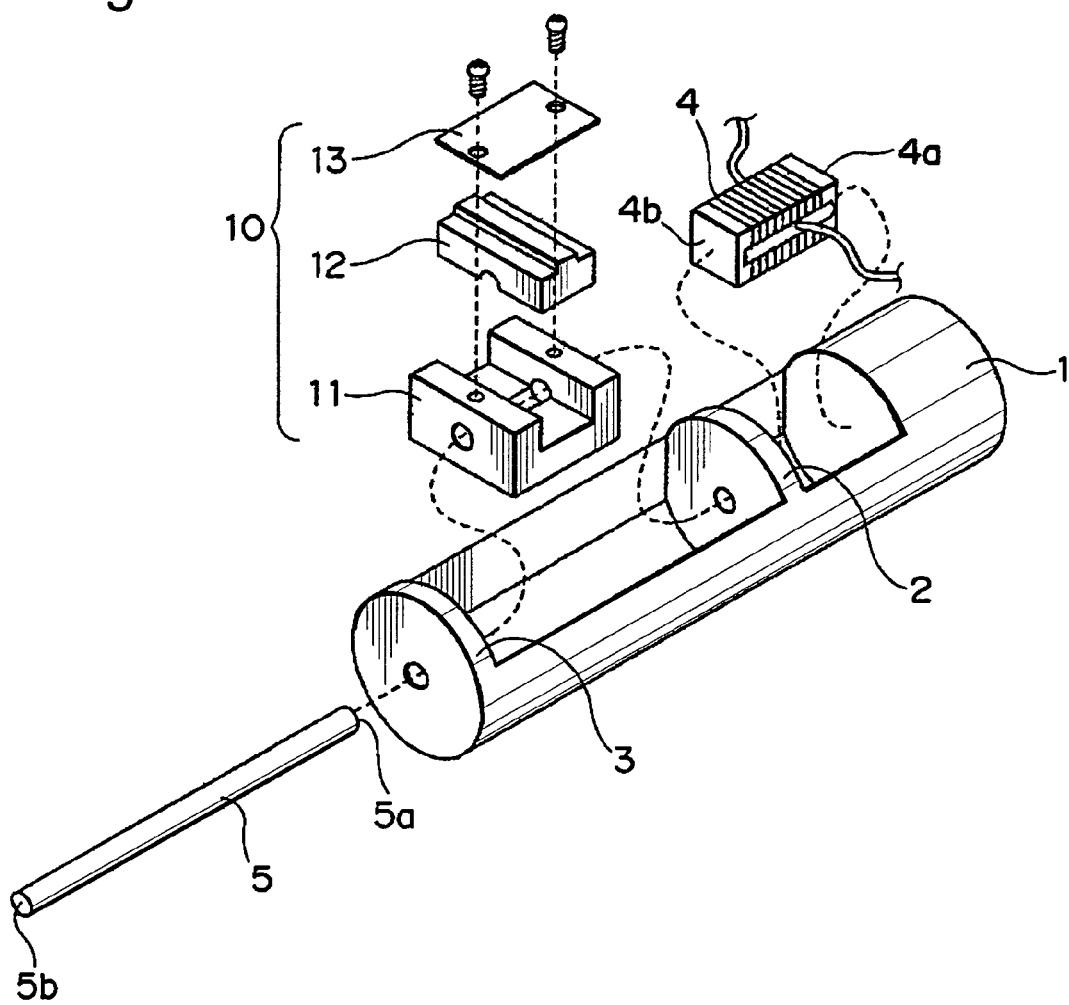
FIG. 1A shows an exploded perspective view of a conventional driving device.
Figure 1B:
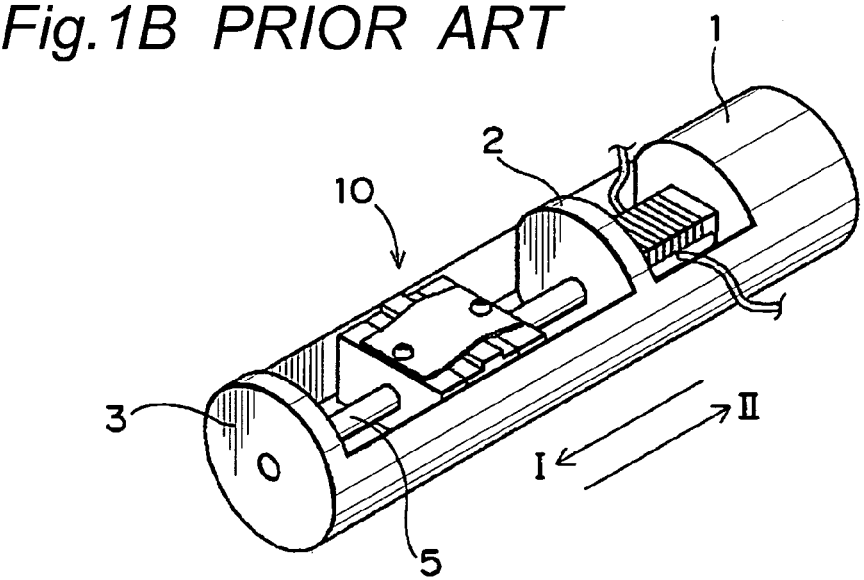
FIG. 1B shows an assembly diagram thereof.
Figure 2:
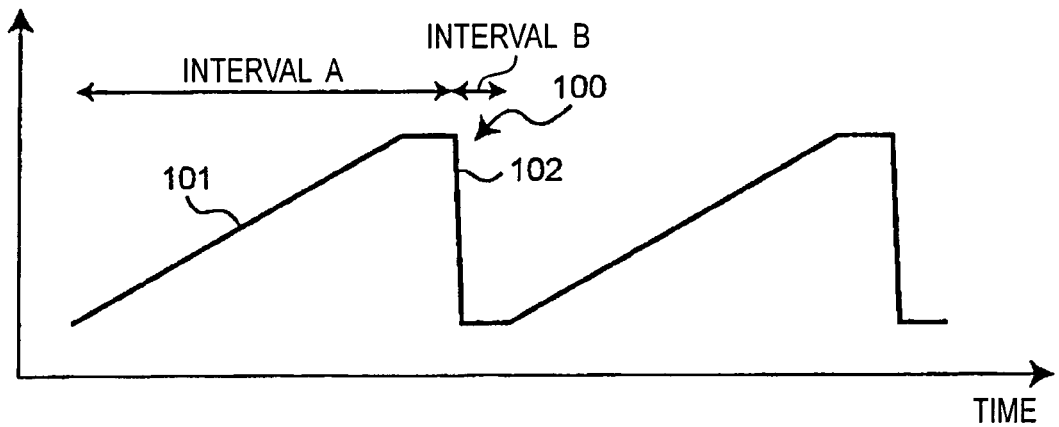
FIG. 2 shows a graph illustrating the principle for driving of the driving device shown in FIG. 1.
Figure 3:
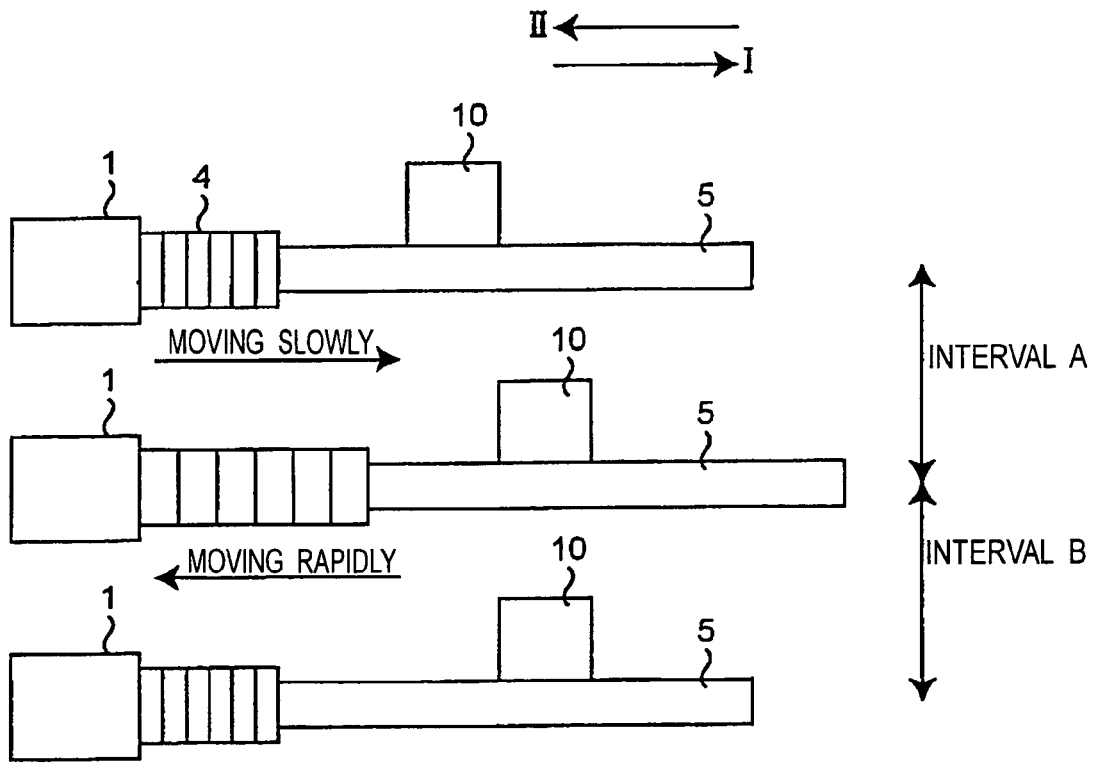
FIG. 3 shows a diagram illustrating the principle for driving of the driving device shown in FIG. 1.

The first weight 21 corresponds to the base 1 in the structure shown in FIGS. 1A and 1B. For example, when the first weight 21 is fixed on an inner steady surface of a lens barrel, lenses connected to the slider 10 can be driven in a direction of an optical axis. The first piezoelectric element 31 is disposed between the first weight 21 and the second weight 22, and the second piezoelectric element 32 is disposed between the rod 25 and the second weight 22.

The slider 10 is frictionally engaged with the outer surface of the rod 25. Herein, the same reference numerals corresponding to those in FIGS. 1A and 1B are assigned and the explanation of the slider 10 is omitted, since the structure of the slider 10 is the same as that of the conventional slider shown in FIGS. 1A and 1B.

As will be described later, predetermined driving voltages are respectively applied to the two piezoelectric elements 31 and 32 from the drive circuits 1 and 2, such that the rod 25 is vibrated with drawing sawtooth-like waveforms, to thereby drive the slider 10 in a desired direction. In the present invention, the manner for realizing the sawtooth-like waveform vibration of the rod is different from the conventional one. But, the principle for moving the slider 10 along the vibrating rod 25 is the same as that in the prior art described with reference to FIGS. 1A to 3.

Preferably, the rod 25 or the slider 10 is vibrated or reciprocated while being supported by a suitable guiding means, although not shown herein.

In the driving device shown in FIGS. 4A and 4B, the weights 21 and 22, the piezoelectric elements 31 and 32, and the rod 25 compose a vibration-generator 40. The masses and the spring constants of the respective members of the vibration-generator 40 are set to specified values to thereby satisfy the relationship of f1=f2/2 in the vibration-generator 40 (a physical vibration system), where f1 is the first resonance frequency of this system, and f2 is the second resonance frequency of this system.

To determine the specified values of the masses and the spring constants, the following modeling is carried out.

Figure 5:
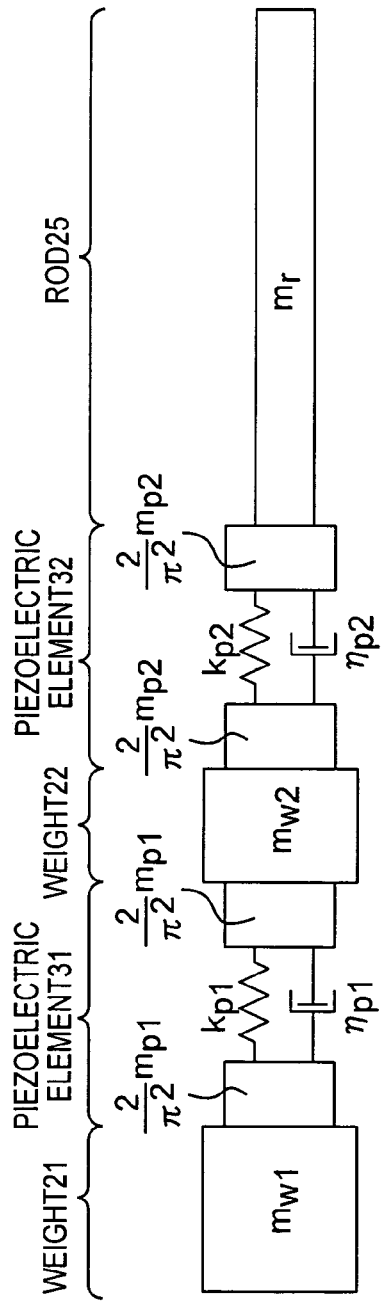
FIG. 5 shows a model of the vibration-generator of the driving device shown in FIG. 4.

The physical structure of the vibration-generator 40 shown in FIGS. 4A and 4B can be modeled as shown in FIG. 5, with taking into account the spring constants and damping forces of the piezoelectric elements.

Figure 6:
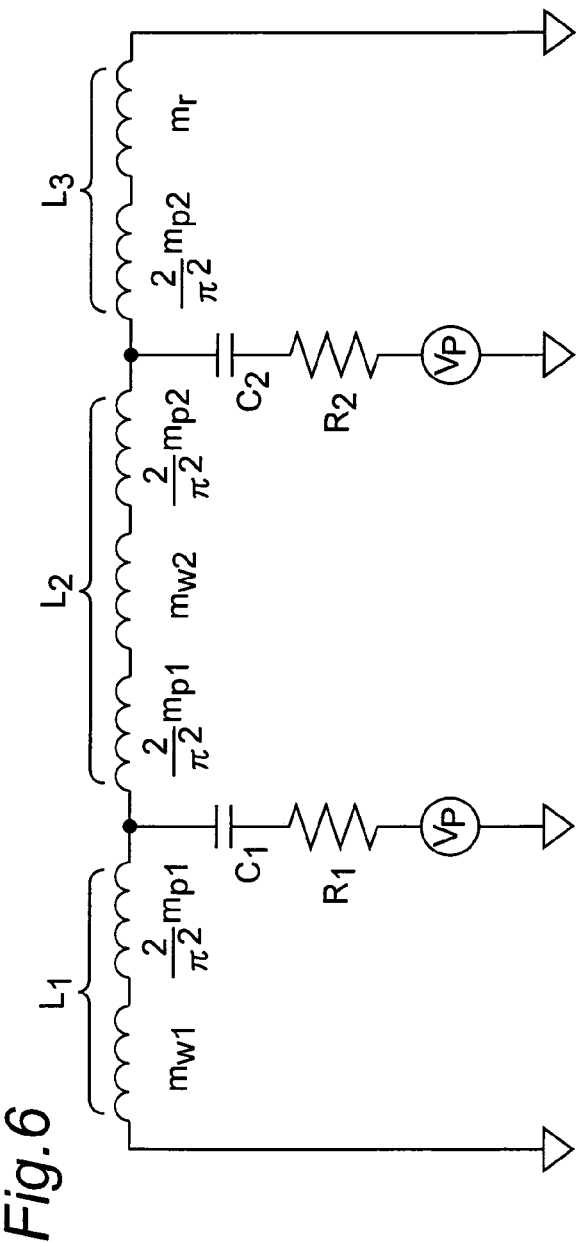
FIG. 6 shows an electric circuit diagram corresponding to the model shown in FIG. 5.

According to the Force-Voltage Method, the model shown in FIG. 5 is equivalent to an electric circuit shown in FIG. 6. With determining the first resonance frequency and the second resonance frequency of this electric circuit, the first resonance frequency and the second resonance frequency of the vibration-generator 40 (a physical vibration system) shown in FIG. 4 can be determined.

In such modeling, the relationship of the mass, spring constant and damping constant of the respective members in the physical vibration system shown in FIG. 5, with the capacity of the capacitor, the reactance of the coil and the electrical resistance of the electric circuit shown in FIG. 6 are as summarized in Table 1 below.

TABLE 1

The relationship of the spring constant of the piezoelectric element with the capacity of the capacitor:
$C_1 = 1/k_{p1}$
$C_2 = 1/k_{p2}$
The relationship of the masses of the weight, the piezoelectric element and the rod with the reactance of the coil:
$L_1 = m_{w1} + 2/\pi^2 m_{p1}$
$L_2 = 2/\pi^2 m_{p1} + m_{w2} + 2/\pi^2 m_{p2}$
$L_3 = 2/\pi^2 m_{p2} + m_r$
The relationship of the damping constant of the piezoelectric element with the electrical resistance:
$R_1 = h_{p1}$
$R_2 = h_{p2}$
where
$m_{w1}$ = the mass of the weight 21
$m_{w2}$ = the mass of the weight 22
$m_{p1}$ = the mass of the piezoelectric element 31
$m_{p2}$ = the mass of the piezoelectric element 32
$m_r$ = the mass of the rod 25
$k_{p1}$ = the spring constant of the piezoelectric element 31
$k_{p2}$ = the spring constant of the piezoelectric element 32
$h_{p1}$ = the damping constant of the piezoelectric element 31
$h_{p2}$ = the damping constant of the piezoelectric element 32

The first resonance frequency f1 and the second resonance frequency f2 in the electric circuit shown in FIG. 6 can be expressed as the following equations (1) and (2).

[Equation (1)]

$$f_1 = \frac{1}{2\pi}\sqrt{\frac{\frac{C_2L_2L_3 + C_2L_1L_3 + C_1L_1L_3 + C_1L_1L_2}{C_1C_2} - \sqrt{\left(\frac{C_2L_2L_3 + C_2L_1L_3 + C_1L_1L_3 + C_1L_1L_2}{C_1C_2}\right)^2 - \frac{L_1L_2L_3(L_1 + L_2 + L_3)}{C_1C_2}}}{2L_1L_2L_3}} \quad (1)$$

[Equation (2)]

$$f_2 = \frac{1}{2\pi}\sqrt{\frac{\frac{C_2L_2L_3 + C_2L_1L_3 + C_1L_1L_3 + C_1L_1L_2}{C_1C_2} + \sqrt{\left(\frac{C_2L_2L_3 + C_2L_1L_3 + C_1L_1L_3 + C_1L_1L_2}{C_1C_2}\right)^2 - \frac{L_1L_2L_3(L_1 + L_2 + L_3)}{C_1C_2}}}{2L_1L_2L_3}} \quad (2)$$

From the equations (1) and (2), the necessary conditions for satisfying that f1=f2/2 is expressed as the equation (3) below, where the electrical resistances $R_1$ and $R_2$ (i.e., the damping constants $h_{p1}$ and $h_{p2}$) are ignored, because they have no relationship with the resonance frequencies.

[Equation (3)]

$$\frac{1}{2\pi}\sqrt{\frac{\frac{C_2L_2L_3+C_2L_1L_3+C_1L_1L_3+C_1L_1L_2}{C_1C_2}-\sqrt{\left(\frac{C_2L_2L_3+C_2L_1L_3+C_1L_1L_3+C_1L_1L_2}{C_1C_2}\right)^2-\frac{L_1L_2L_3(L_1+L_2+L_3)}{C_1C_2}}}{2L_1L_2L_3}}=\frac{1}{2}\times$$

$$\frac{1}{2\pi}\sqrt{\frac{\frac{C_2L_2L_3+C_2L_1L_3+C_1L_1L_3+C_1L_1L_2}{C_1C_2}-\sqrt{\left(\frac{C_2L_2L_3+C_2L_1L_3+C_1L_1L_3+C_1L_1L_2}{C_1C_2}\right)^2-\frac{L_1L_2L_3(L_1+L_2+L_3)}{C_1C_2}}}{2L_1L_2L_3}}$$

The equation (4) is derived from the equation (3).

[Equation (4)]

$$\frac{C_1C_2L_1L_2L_3(L_1+L_2+L_3)}{(C_2L_2L_3+C_2L_1L_3+C_1L_1L_3+C_1L_1L_2)^2}=\frac{4}{25} \quad (4)$$

Based on the relationships shown in Table 1, the equation (4) can be transformed using the masses and the spring constants, and the following equation (5) is derived.

[Equation (5)]

$$\frac{\frac{1}{K_{p1}K_{p2}}\left(m_{w1}+\frac{2}{\pi^2}m_{p1}\right)\left(\frac{2}{\pi^2}m_{p1}+m_{w2}+\frac{2}{\pi^2}m_{p2}\right)}{\left(\frac{1}{K_{p2}}\left(\frac{2}{\pi^2}m_{p1}+m_{w2}+\frac{2}{\pi^2}m_{p2}\right)\left(\frac{2}{\pi^2}m_{p2}+m_r\right)+\left(\frac{1}{K_{p1}}+\frac{1}{K_{p2}}\right)\left(m_{w1}+\frac{2}{\pi^2}m_{p1}\right)\left(\frac{2}{\pi^2}m_{p2}+m_r\right)+\frac{1}{K_{p1}}\left(m_{w1}+\frac{2}{\pi^2}m_{p1}\right)\left(\frac{2}{\pi^2}m_{p1}+m_{w2}+\frac{2}{\pi^2}m_{p2}\right)\right)^2}=\frac{4}{25}$$

$$\left(\frac{2}{\pi^2}m_{p2}+m_r\right)\left(m_{w1}+m_{w2}+m_r+\frac{4}{\pi^2}m_{p1}+\frac{4}{\pi^2}m_{p2}\right)$$

Thus, if the vibration-generator 40 is assembled from the members which have the masses and the spring constants satisfying the equation (5), the physical resonance frequencies of the vibration-generator 40 will satisfy the relationship of f1=f2/2.

The masses and the spring constants of the respective members in the embodiment shown in FIGS. 4A and 4B are shown in Table 2.

TABLE 2

|  | Mass | Spring constant |
| --- | --- | --- |
| Weight 21 | 148 mg | — |
| Piezoelectric element 31 | 55 mg | 41250000 N/m |
| Weight 22 | 65 mg | — |
| Piezoelectric element 32 | 55 mg | 41250000 N/m |
| Rod 25 | 12 mg | — |

Figure 7:
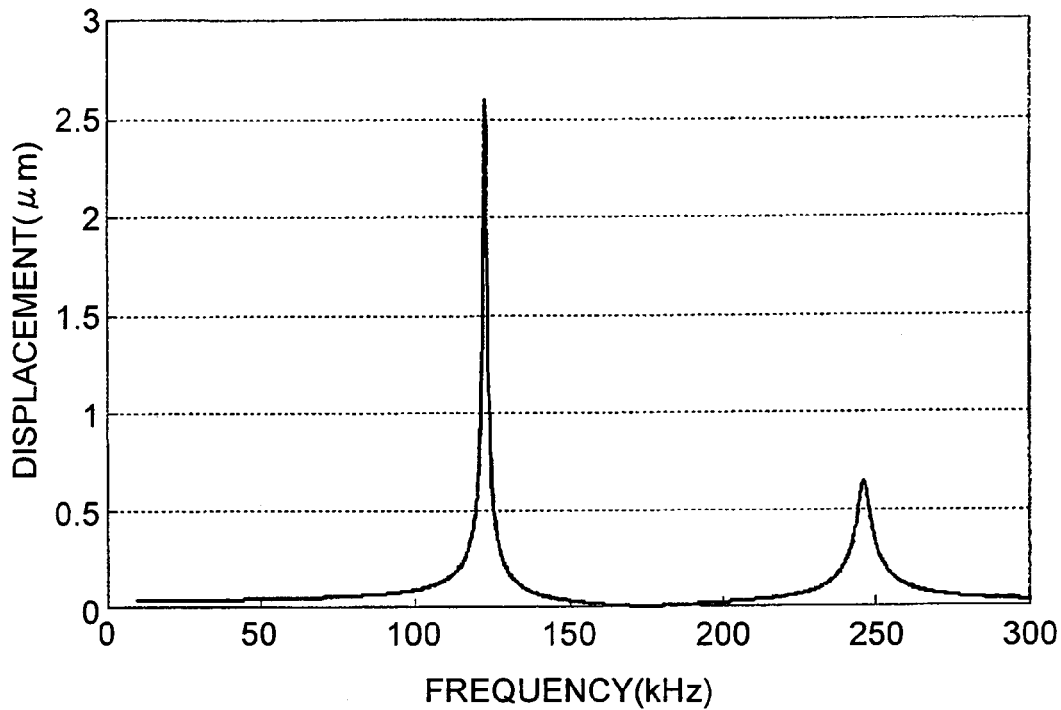
FIG. 7 shows a graph illustrating the vibration characteristics of the vibration-generator of the driving device shown in FIG. 4.

FIG. 7 is a graph showing the characteristics of the frequencies of the vibration-generator 40 (a physical vibration system) assembled as above. The first resonance frequency f1 of this system is 123 kHz, and the second resonance frequency f2 thereof is 246 kHz. Thus, the relationship of f1=f2/2 is satisfied.

Figure 8:
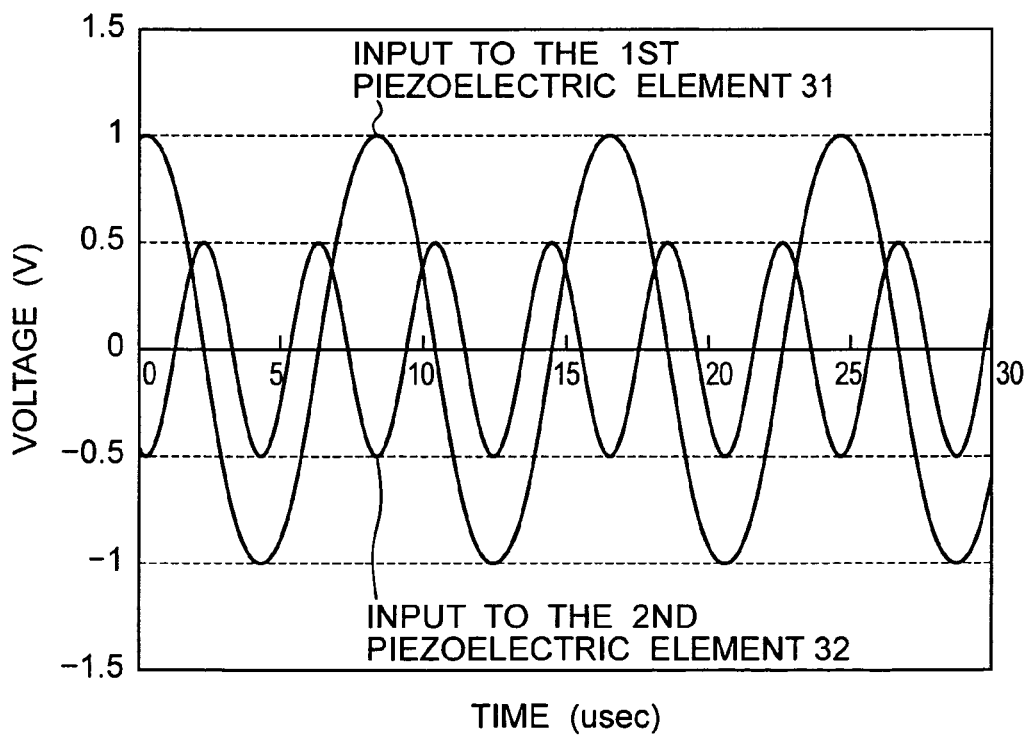
FIG. 8 shows a graph illustrating the waveforms of voltages input to the driving device shown in FIG. 4.
Figure 9:
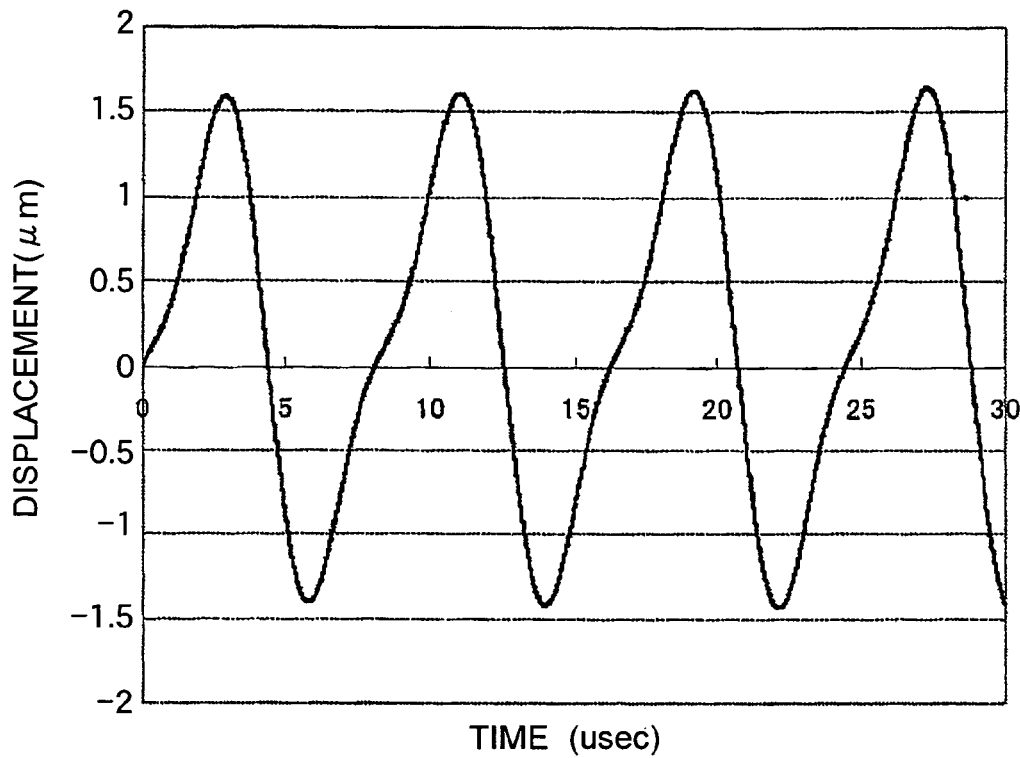
FIG. 9 shows a graph illustrating the waveform of the rod vibration when the voltages shown in FIG. 8 are applied.

The relationships of the applied voltages with the vibration waveform of the rod are shown in FIGS. 8 and 9, where a voltage of sine waveform pulses having an amplitude of 2 V and a frequency of 123 kHz is applied to the first piezoelectric element 31 of the vibration-generator 40, and a voltage of sine waveform pulses having an amplitude of 1V and a frequency of 246 kHz is applied to the second piezoelectric element 32 thereof, with a phase difference of 90 deg therebetween. FIG. 8 shows the waveforms of the applied voltages, and FIG. 9 shows the vibration waveform of the rod.

A regular sawtooth-like vibration waveform of the rod is realized. Thus, the slider 10 can be driven in a predetermined direction.

<Second Embodiment (FIGS. 10 and 11)>

Figure 10:
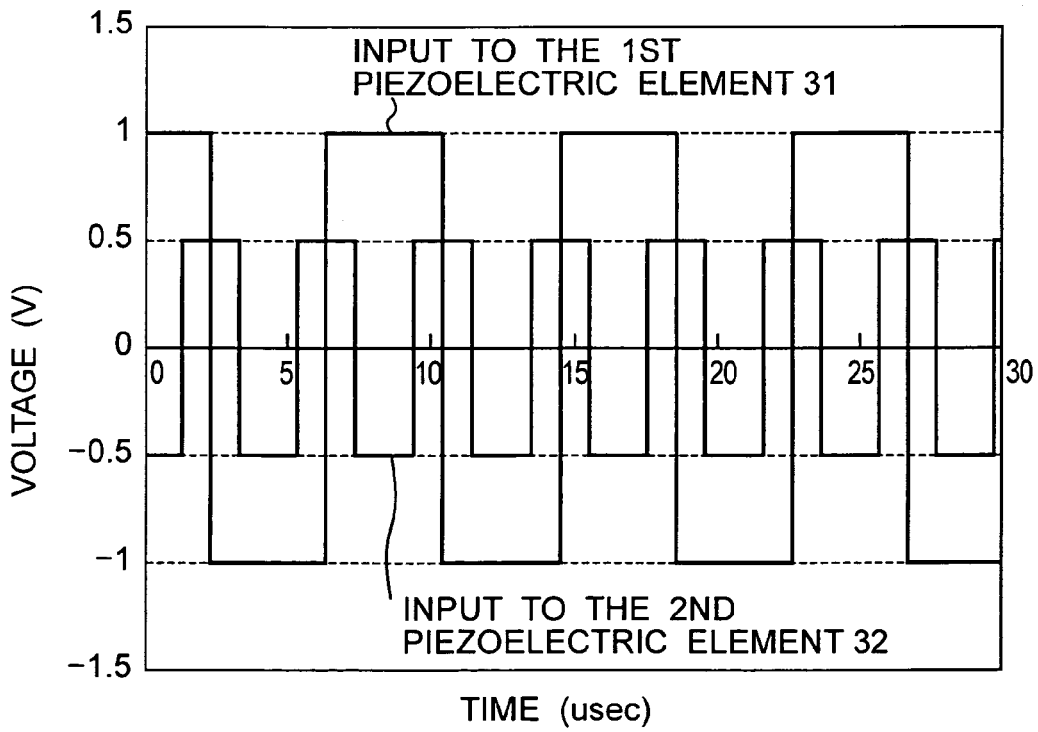
FIG. 10 shows a graph illustrating the waveforms of voltages input to a driving device according to the second embodiment of the present invention.
Figure 11:
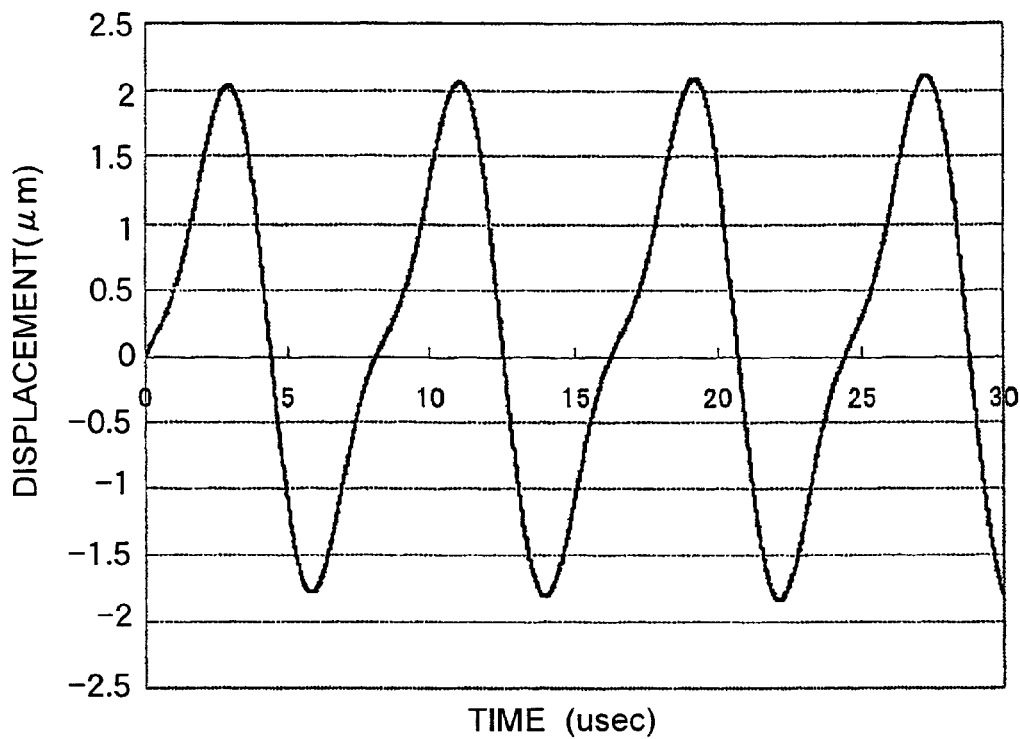
FIG. 11 shows a graph illustrating the waveform of the rod vibration when the voltages shown in FIG. 10 are applied.

In the second embodiment, instead of the voltages of sine waveform pulses, voltages of rectangular waveform pulses having duty ratios of 1/2 are applied to the driving device, which is assembled as above-mentioned to satisfy the relationship of f1=f2/2. FIG. 10 shows the voltages of rectangular waveform pulses applied to the first piezoelectric element 31 and the second piezoelectric element 32, wherein a voltage of rectangular waveform pulses, having an amplitude of 2V, a frequency of 123 kHz and a duty ratio of 1/2 is applied to the first piezoelectric element 31, and a voltage of rectangular waveform pulses, having an amplitude of 1V, a frequency of 246 kHz and a duty ratio of 1/2 is applied to the second piezoelectric element 32.

In general, a rectangular waveform can be expressed as the sum of a plurality of sine waveforms, according to the Fourier expansion. The general formula thereof is expressed by the following equation (6).

[Equation (6)]

$$V(t)=V_d\cdot\frac{4}{\pi}\left(\frac{\sin(\pi Du)}{1}\sin(\omega_d t)+\frac{\sin 2(\pi Du)}{2}\sin\left(2\omega_d t+\frac{\pi}{2}\right)+\frac{\sin 3(\pi Du)}{3}\sin(3\omega_d t+\pi)+\frac{\sin 4(\pi Du)}{4}\sin\left(4\omega_d t+\frac{3\pi}{2}\right)+\cdots\right) \quad (6)$$

In the equation (6), Vd is amplitude of a rectangular waveform pulse; ωd is angular velocity; Du is duty ratio; and t is time. Further, in the large bracket in the equation (6), the first term, the second term, . . . , and the Nth term, respectively, represents the first component, the second component, . . . , and the "n"th component of the plurality of sine waveforms.

In the equation (6), if Du equals 1/2 (50%), the second term in the bracket is zero. In other words, the voltage of rectangular waveform pulses having a Du of 1/2 does not contain the second sine wave component. Thus, if the frequency of the rectangular waveform signal input to the first piezoelectric element 31 is 123 kHz (i.e., the first resonance frequency of the system), the first resonance component alone is enlarged by this inputting, where the higher terms equal or more than the third order is ignored, because such higher terms are reduced due to the transfer characteristics of the piezoelectric element.

Likewise, if the frequency of the rectangular waveform signal input to the second piezoelectric element 32 is 246 kHz (i.e., the second resonance frequency of the system), the second resonance component alone is enlarged by this inputting. Thus, a regular sawtooth-like vibration of the rod, as is obtained when two voltages of sine waveform pulses as shown in FIG. 8 are input, can be obtained (see FIGS. 10 and 11).

<Third Embodiment (FIGS. 12 and 13 )>

Figure 12:
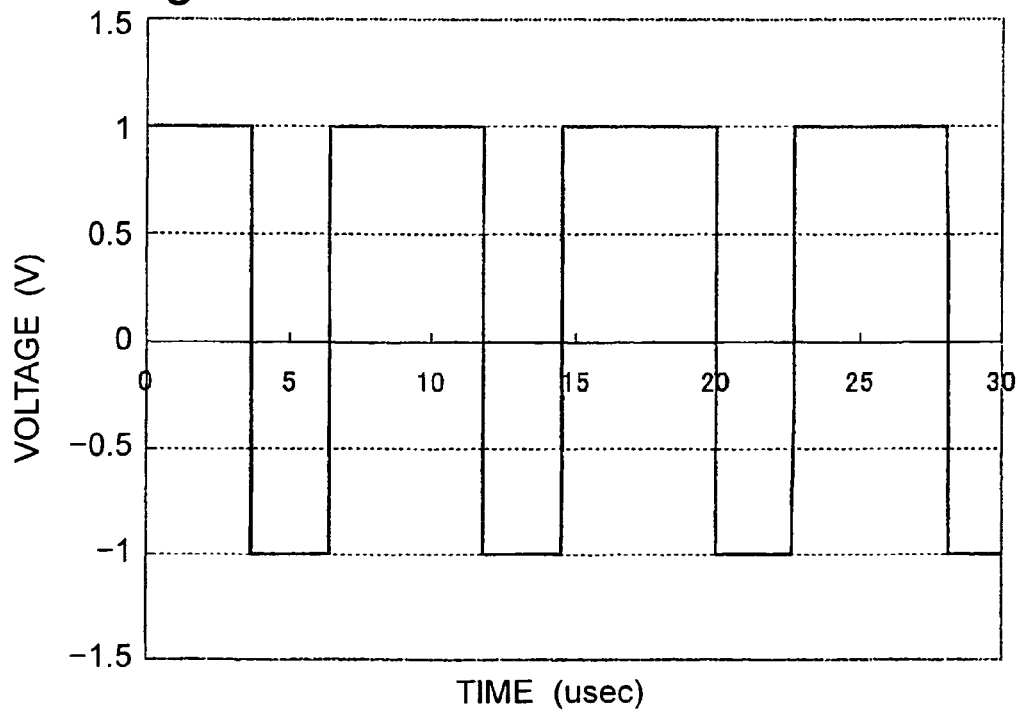
FIG. 12 shows a graph illustrating the waveforms of voltages input to a driving device according to the third embodiment of the present invention.

In the third embodiment, the same voltages of rectangular waveform pulses as shown in FIG. 12 are applied to both of the first piezoelectric element 31 and the second piezoelectric element 32 of the driving device, which is assembled as above-mentioned to satisfy the relationship of f1=f2/2. The voltage of rectangular waveform pulses have an amplitude of 2V, a frequency of 123 kHz (which equals the first resonance frequency of the system), and a duty ratio of 2/3.

In the case where the same voltages of rectangular waveform pulses are applied to two piezoelectric elements, it is necessary that the rectangular waveform contains the second sine wave component. Therefore, the duty ratio should not be 1/2. This is because the voltage of rectangular waveform pulses having a duty ratio of 1/2 does not contain the second sine wave component, as mentioned above.

For this reason, the duty ratios of the voltages of rectangular waveform pulses in the third embodiment are set at 2/3. Note that the duty ratio of 2/3 is not always needed, and a duty ratio not equal to 1/2 would be enough. The frequencies of these voltages of rectangular waveform pulses are set at 123 kHz, which equals the first resonance frequency of the system.

Figure 13:
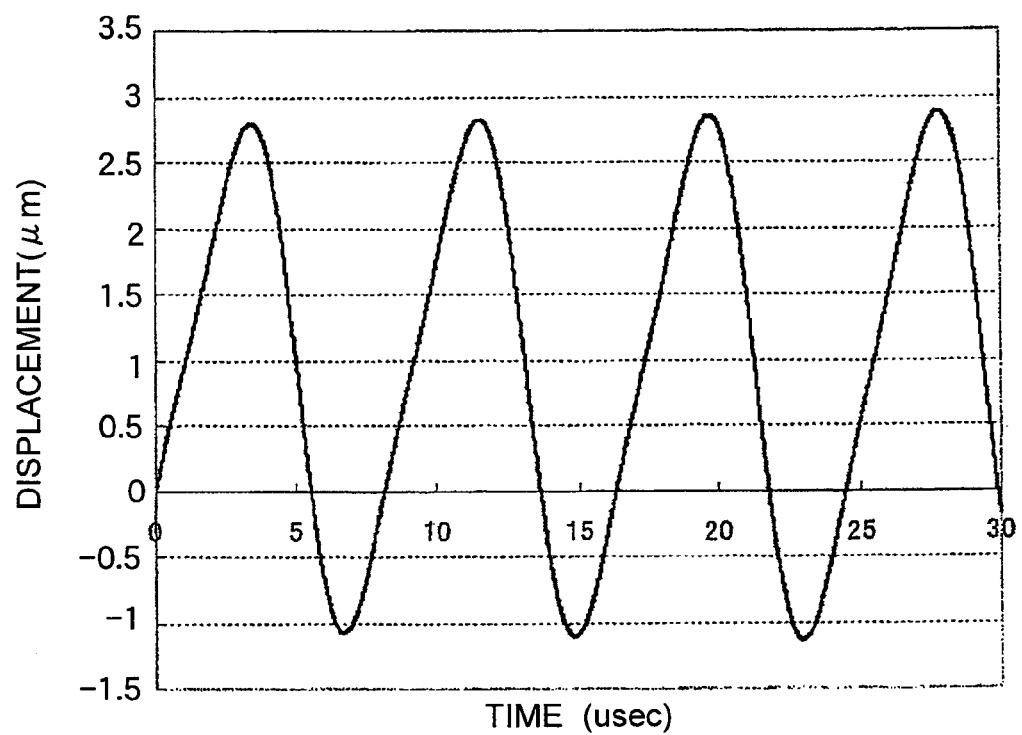
FIG. 13 shows a graph illustrating the waveform of the rod vibration when the voltages shown in FIG. 12 are applied.

With the voltages of rectangular waveform pulses as above being applied to the piezoelectric elements, the first resonance component and the second resonance component are enlarged, so that a regular sawtooth-like vibration of the rod as shown in FIG. 13 can be obtained.

<Fourth Embodiment (FIGS. 14 and 15 )>

Figure 14:
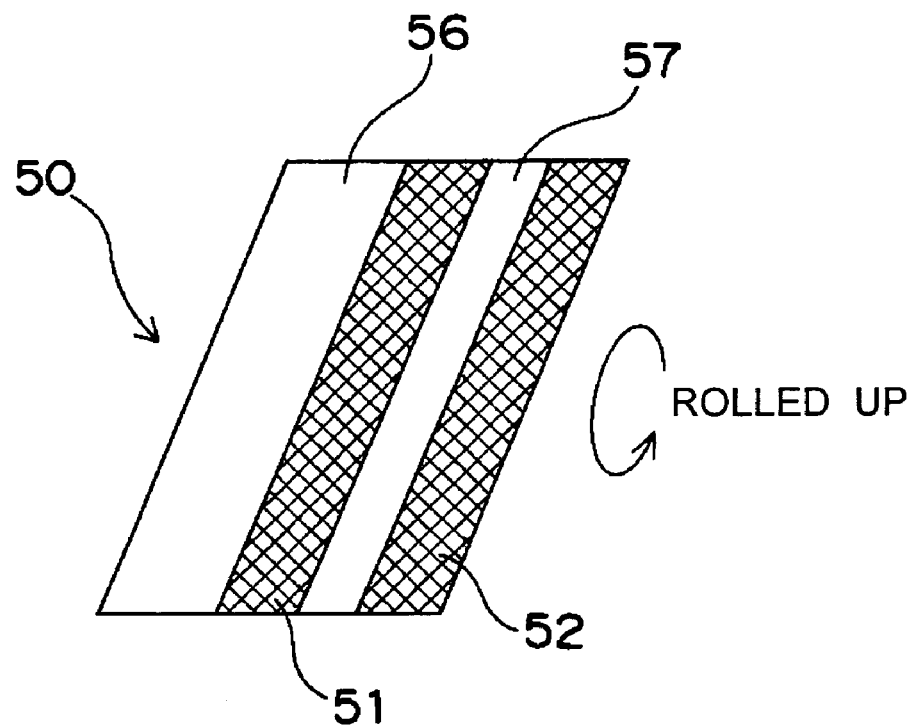
FIG. 14 shows a perspective view of the essential portion of a driving device according to the fourth embodiment of the present invention.
Figure 14:
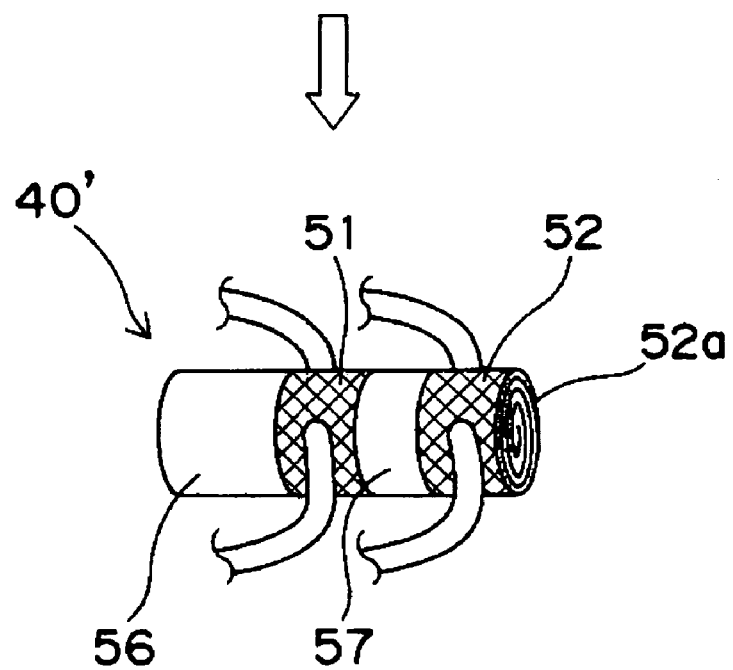

In the fourth embodiment, a roll type piezoelectric element is used, in which two weight-sections and two piezoelectric-element-sections are integrally composed. As shown in FIG. 14, electrodes 51 and 52 with an interval are applied on a piezoelectric sheet 50. This piezoelectric sheet 50 is rolled up, and a rod (not shown) is fixed to the resultant roll to provide a vibration-generator. The fields 56 and 57 of the piezoelectric sheet on which electrodes are not applied can not be expanded or contracted, and therefore can serve as weights.

In the embodiment shown in FIG. 14, the weight-section 56 corresponds to the weight 21 in FIG. 4, and the weight-section 57 corresponds to the weight 22 in FIG. 4. The fields 51 and 52 of the piezoelectric sheet on which the electrodes are applied function as piezoelectric elements, and these sections (after rolled up) correspond to the piezoelectric elements 31 and 32 in FIG. 4, respectively. The rod is fixed to one end 52a of the piezoelectric-element-section 52.

Figure 15:
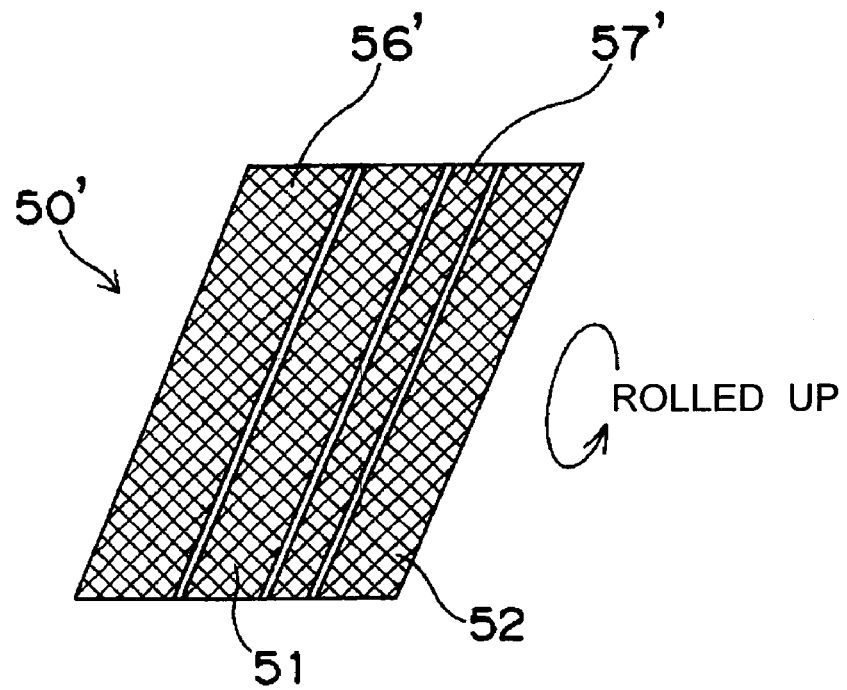
FIG. 15 shows a perspective view of the essential portion of a driving device according to a modification to the fourth embodiment shown in FIG. 14.
Figure 15:
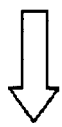
Figure 15:
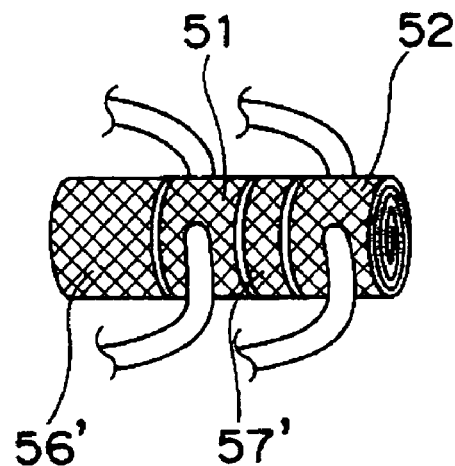

FIG. 15 shows a modification to the embodiment shown in FIG. 14. The modification shown in FIG. 15 differs from the embodiment shown in FIG. 14 in that electrodes are applied also to the weight-sections 56' and 57'. With no voltages being applied thereto, the sections would not expand or contract even if the electrodes are applied thereto. Thus, such the sections 56' and 57' can serve as weight-sections. The electrodes on the weight-sections 56' and 57' are applied with slit-like spaces between themselves and the electrodes 51 and 52, respectively, such that the voltages are not to be applied thereto. In the case where the fields on which the electrodes are applied function as weight-sections, it is possible to reduce the volumes of such weight-sections, because the specific gravity of such weight-section is larger than that of weight-sections having no electrodes thereon. As a result, the driving device can be advantageously made compact.

In the illustrated embodiment, the weight-sections 56' and 57' are insulated by providing the slits so that voltages can not be applied to the electrodes thereon. But, not only slits but also other appropriate means may be used to insulate the weight-sections 56' and 57'.

Also in the constitutions shown in FIGS. 14 and 15 (a physical vibration system), the relationship of f1=f2/2 can be obtained, by determining the masses and the spring constants of the respective members of the systems in accordance with the modeling as described with reference to FIGS. 5 and 6.

In the fourth embodiment, the two piezoelectric-element-sections are formed of the same material, and therefore C1 equals C2 (C1=C2). Accordingly, the equations (4) and (5) are expressed as the following equations (4') and (5').

[Equation (4')]

$$\frac{L_1 L_2 L_3 (L_1 + L_2 + L_3)}{(L_2 L_3 + L_1 L_3 + L_1 L_3 + L_1 L_2)^2} = \frac{4}{25} \quad (4')$$

[Equation (5')]

$$\frac{\left(m_{w1} + \frac{2}{\pi^2} m_{p1}\right)\left(\frac{2}{\pi^2} m_{p1} + m_{w2} + \frac{2}{\pi^2} m_{p2}\right)}{\left(\frac{2}{\pi^2} m_{p2} + m_r\right)\left(m_{w1} + m_{w2} + m_r + \frac{4}{\pi^2} m_{p1} + \frac{4}{\pi^2} m_{p2}\right)} = \frac{4}{25}$$

$$\left(\left(\frac{2}{\pi^2} m_{p1} + m_{w2} + \frac{2}{\pi^2} m_{p2}\right)\left(\frac{2}{\pi^2} m_{p2} + m_r\right) + 2\left(m_{w1} + \frac{2}{\pi^2} m_{p1}\right)\left(\frac{2}{\pi^2} m_{p2} + m_r\right) + \left(m_{w1} + \frac{2}{\pi^2} m_{p1}\right)\left(\frac{2}{\pi^2} m_{p1} + m_{w2} + \frac{2}{\pi^2} m_{p2}\right)\right)^2 \quad (5')$$

<Fifth Embodiment (FIGS. 16 and 17 )>

In any of the foregoing embodiments, the vibration-generator 40 comprises two piezoelectric elements 31 and 32. But, the vibration-generator can comprise three or more piezoelectric elements. In the fifth embodiment, three piezoelectric elements are used to compose a vibration-generator.

To the vibration-generator as shown in FIG. 4, a third piezoelectric element is added, which is disposed in series between the piezoelectric elements 31 and 32. Further, respective weights are disposed between the piezoelectric element 31 and the third piezoelectric element, and between the piezoelectric element 32 and the third piezoelectric element.

Figure 16:
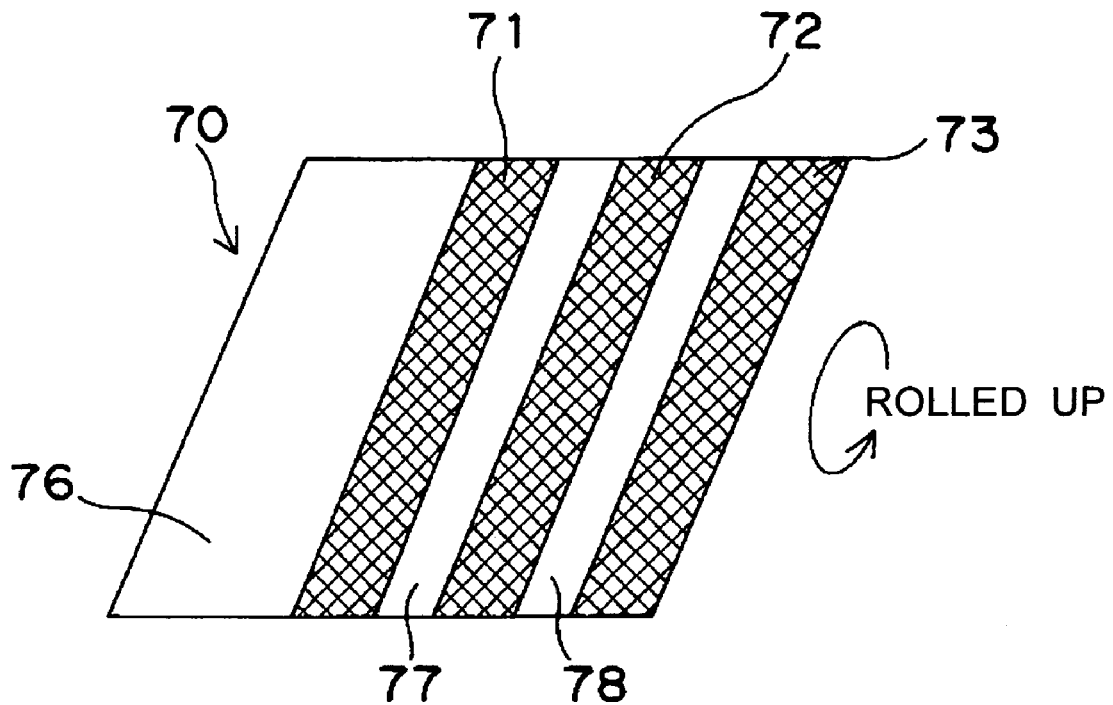
FIG. 16 shows a perspective view of the essential portion of a driving device according to the fifth embodiment of the present invention.
Figure 16:
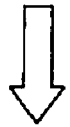
Figure 16:
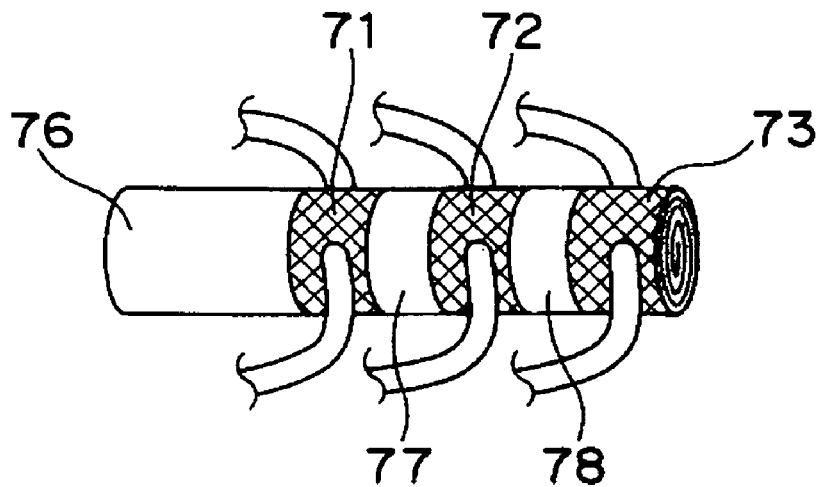

In another case, as shown in FIG. 16, a piezoelectric sheet 70 is rolled up, and a rod (not shown) is fixed thereto so that a vibration-generator is composed. The embodiment shown in FIG. 16 is constructed in the same manner as in the embodiment shown in FIG. 14. That is, electrodes 71, 72 and 73 with certain intervals are applied on the piezoelectric sheet 70, and then, the sheet 70 is rolled up to provide an integral vibration-generator. The fields of the sheet on which the electrodes are not applied can not expand or contract, and thus can serve as weight-sections. In this regard, electrodes (not shown) can be applied also to the fields of the sheet which are to be functioned as weights, like in the embodiment shown in FIG. 15.

Also in this vibration-generator comprising three piezoelectric elements, the relationship of f1=f2/2=f3/3 can be obtained for the first to the third resonance frequencies of the vibration-generator, where f3 is the third resonance frequency. This is realized by determining the masses and the spring constants of the respective members of the systems in accordance with the modeling based on the Force-Voltage Method as described above.

Figure 18:
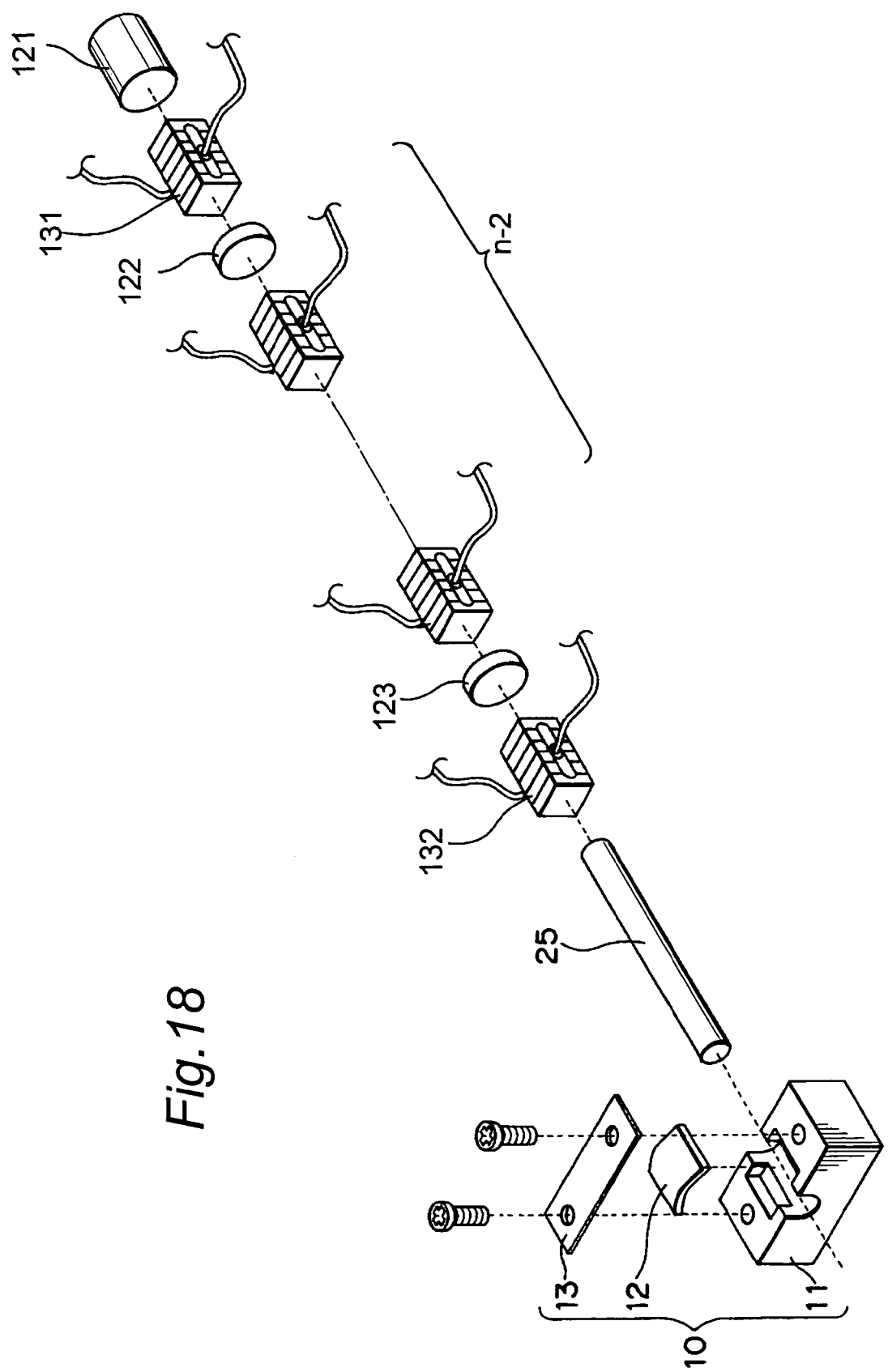
FIG. 18 shows another embodiment, wherein "n" piezoelectric elements are used.

The same is also true in a vibration-generator comprising four or more piezoelectric elements. FIG. 18 shows an embodiment, wherein "n" piezoelectric elements are used. In FIG. 18, one end of the first piezoelectric element 131 is fixed to the first weight 121, and one end of the second piezoelectric element 132 is fixed to the rod 25. Between the first and the second piezoelectric elements, there is provided "n−2" piezoelectric elements. Thus, in total, "n" piezoelectric elements are used. Between each of the "n" piezoelectric elements, the respective weight is provided, only the weights 122 and 123 being illustrated in FIG. 18. Also in such the embodiment, the relationship of f1=f2/2= . . . =fn/n can be obtained in accordance with the modeling based on the Force-Voltage Method, where fn is "n"th resonance frequency.

Figure 17:
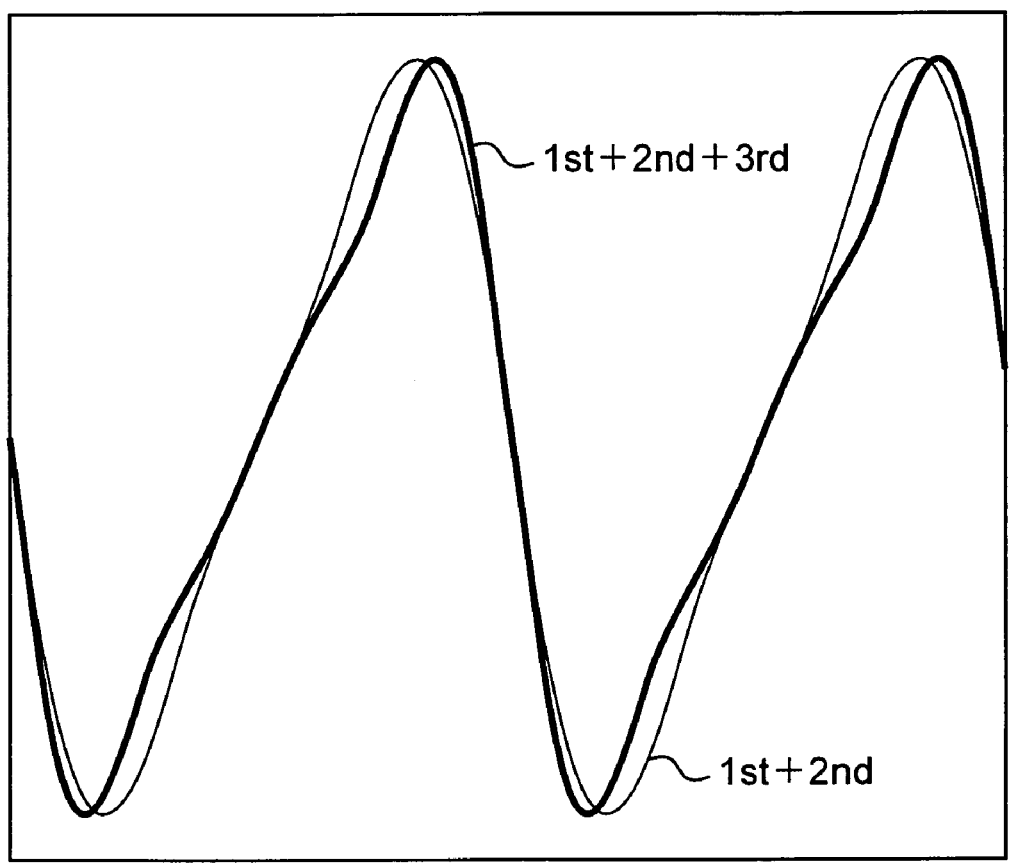
FIG. 17 shows a graph illustrating the waveform of the rod vibration in the fifth embodiment.

In the fifth embodiment, the first to the third resonance frequencies can be utilized. Thus, more ideal vibration waveform can be obtained for the rod, as compared with any of the vibration-generator in which the first and the second resonance frequencies are utilized. As shown in FIG. 17, the inclination of the rising portion of the vibration waveform becomes more gentle in the embodiment utilizing the first to the third resonance frequencies, as compared with the embodiment utilizing the first and the second resonance frequencies. Thus, the vibration waveform is more close to an ideal sawtooth-like waveform shown in FIG. 2.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A driving device comprising:
    a vibration-generator comprised of a first weight fixed to a predetermined steady surface; a first electromechanical conversion element, one end of which in its expanding or contracting direction is fixed to the first weight; a second weight fixed to the other end of the first electromechanical conversion element in the expanding or contracting direction; a second electromechanical conversion element, one end of which in its expanding or contracting direction is fixed to the second weight; and a rod fixed to the other end of the second electromechanical conversion element in the expanding or contracting direction,
    a slider which is frictionally engaged with the outer surface of the rod of the vibration-generator, and a degree of the frictional engagement is set, so that the slider can move together with the rod when the rod is moved at a speed lower than a predetermined speed, and a moving amount of the slider becomes smaller than that of the rod when the rod is moved at a speed higher than the predetermined speed, and
    a drive circuit which applies voltages to the first electromechanical conversion element and the second electromechanical conversion element to cause the rod to vibrate, such that a moving speed of the rod in one direction is lower than the predetermined speed and a moving speed of the rod in the other direction is higher than the predetermined speed, so as to move the slider along the rod in the one direction,
    characterized in that a second resonance frequency of the vibration-generator is set to be twice a first resonance frequency thereof by satisfying the following equation, where a mass of the first weight is $m_{w1}$; a mass of the first electromechanical conversion element is $m_{p1}$; a spring constant of the first electromechanical conversion element is $k_{p1}$; a mass of the second weight is $m_{w2}$; a mass of the second electromechanical conversion element is $m_{p2}$; a spring constant of the second electromechanical conversion element is $k_{p2}$; and a mass of the rod is $m_r$.

$$\frac{\frac{1}{K_{p1}K_{p2}}\left(m_{w1}+\frac{2}{\pi^2}m_{p1}\right)\left(\frac{2}{\pi^2}m_{p1}+m_{w2}+\frac{2}{\pi^2}m_{p2}\right)}{\left(\frac{2}{\pi^2}m_{p2}+m_r\right)\left(m_{w1}+m_{w2}+m_r+\frac{4}{\pi^2}m_{p1}+\frac{4}{\pi^2}m_{p2}\right)} = \frac{4}{25}$$

$$\left(\frac{1}{K_{p2}}\left(\frac{2}{\pi^2}m_{p1}+m_{w2}+\frac{2}{\pi^2}m_{p2}\right)\left(\frac{2}{\pi^2}m_{p2}+m_r\right)+\left(\frac{1}{K_{p1}}+\frac{1}{K_{p2}}\right)\left(m_{w1}+\frac{2}{\pi^2}m_{p1}\right)\left(\frac{2}{\pi^2}m_{p2}+m_r\right)+\frac{1}{K_{p1}}\left(m_{w1}+\frac{2}{\pi^2}m_{p1}\right)\left(\frac{2}{\pi^2}m_{p1}+m_{w2}+\frac{2}{\pi^2}m_{p2}\right)\right)^2$$
[Equation]

2. The driving device of claim 1, wherein
the drive circuit comprises a first drive circuit which drives the first electromechanical conversion element with a voltage of sine waveform having the first resonance frequency, and a second drive circuit which drives the second electromechanical conversion element with a voltage of sine waveform having the second resonance frequency.

3. The driving device of claim 1, wherein
the drive circuit comprises a first drive circuit which drives the first electromechanical conversion element with a voltage of rectangular waveform of duty ratio of 1/2 having the first resonance frequency, and a second drive circuit which drives the second electromechanical conversion element with a voltage of rectangular waveform of duty ratio of 1/2 having the second resonance frequency.

4. The driving device of claim 1, wherein
the drive circuit comprises a first drive circuit which drives the first electromechanical conversion element and a second drive circuit which drives the second electromechanical conversion element, and
both of the first drive circuit and the second drive circuit conduct the driving with voltages of same rectangular waveform having the first resonance frequency, and duty ratio of the waveform is not 1/2.

5. The driving device of claim 1, wherein
the first weight, the first electromechanical conversion element, the second weight, and the second electromechanical conversion element of the vibration-generator are integrally formed by rolling up a piezoelectric sheet, wherein electrodes are applied to fields of the piezoelectric sheet corresponding to the first electromechanical conversion element and the second electromechanical conversion element.

6. The driving device of claim 5, wherein
electrodes are also applied to fields of the piezoelectric sheet corresponding to the first weight and the second weight, and the electrodes on the fields corresponding to the first weight and the second weight are insulated from the electrodes on the fields corresponding to the first electromechanical conversion element and the second electromechanical conversion element, such that the voltages are not to be applied to the electrodes on the fields corresponding to the first weight and the second weight.

7. A driving device comprising:

a vibration-generator comprised of a first weight fixed to a predetermined steady surface; "n" (n is natural number of 3 or more) electromechanical conversion elements arranged in series including a first electromechanical conversion element, one end of which in its expanding or contracting direction is fixed to the first weight and a second electromechanical conversion element, one end of which in its expanding or contracting direction is fixed to a rod; and intermediate weights each of which is located between each of the "n" electromechanical conversion elements, a slider which is frictionally engaged with the outer surface of the rod of the vibration-generator, and a degree of the frictional engagement is set, so that the slider can move together with the rod when the rod is moved at a speed lower than a predetermined speed, and a moving amount of the slider becomes smaller than that of the rod when the rod is moved at a speed higher than the predetermined speed, and a drive circuit which applies voltages to each of the "n" electromechanical conversion elements to cause the rod to vibrate, such that a moving speed of the rod in one direction is lower than the predetermined speed and a moving speed of the rod in the other direction is higher than the predetermined speed, so as to move the slider along the rod in the one direction, characterized in that a mass of each of the intermediate weights and the rod, and a mass and a spring constant of each of the "n" electromechanical conversion elements included in the vibration-generator are determined so that a relationship of $f1=f2/2=\ldots=fm/m$ is satisfied, where $f1$ is first resonance frequency, $f2$ is second resonance frequency, . . . , and $fm$ is "m"th resonance frequency of the vibration-generator.

8. The driving device of claim 7, wherein the weights and the "n" electromechanical conversion elements included in the vibration-generator are integrally formed by rolling up a piezoelectric sheet, wherein electrodes are applied to fields of the piezoelectric sheet corresponding to the "n" electromechanical conversion elements.

9. The driving device of claim 8, wherein electrodes are also applied to fields of the piezoelectric sheet corresponding to the weights, and the electrodes on the fields corresponding to the weights are insulated from the electrodes on the fields corresponding to the "n" electromechanical conversion elements, such that voltages are not to be applied to the electrodes on the fields corresponding to the weights.

* * * * *